United States Patent

Taylor

[15] 3,638,059
[45] Jan. 25, 1972

[54] EXTREME ULTRAVIOLET RADIATION PHOTOMETERS

[72] Inventor: Randolph G. Taylor, Washington, D.C.

[73] Assignee: The United States of America as represented by the Secretary of the Navy

[22] Filed: Apr. 27, 1970

[21] Appl. No.: 31,891

[52] U.S. Cl. ............................................. 313/93, 313/102
[51] Int. Cl. .................................... H01j 39/26, H01j 39/00
[58] Field of Search .................. 313/93, 94, 95, 101, 74, 102

[56] References Cited

UNITED STATES PATENTS

| | | | |
|---|---|---|---|
| 2,234,801 | 3/1941 | Gorlich | 313/95 |
| 3,213,308 | 10/1965 | Feibelman | 313/101 X |
| 3,211,937 | 10/1965 | Hester et al. | 313/74 |
| 2,730,637 | 1/1956 | Atlee | 313/74 X |

*Primary Examiner*—Ronald L. Wibert
*Assistant Examiner*—Conrad Clark
*Attorney*—R. S. Sciascia, Arthur L. Branning and M. L. Crane

[57] ABSTRACT

This disclosure is directed to an extreme ultraviolet radiation photometer which includes a special type window and cathode suitable for permitting radiation to penetrate the window which reacts with the cathode to produce electrons which are attracted to the window and produces a current flow which is measured to represent the radiation detected.

9 Claims, 2 Drawing Figures

PATENTED JAN 25 1972

3,638,059

INVENTOR
RANDOLPH G. TAYLOR

BY *Melvin L Crane* AGENT
*Arthur L ...* ATTORNEY

3,638,059

EXTREME ULTRAVIOLET RADIATION PHOTOMETERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore various types of detectors have been used for monitoring the solar ultraviolet and X-ray radiation. Such photometers are usually referred to as gas-filled ionization chambers sensitive to the spectral regions of 0.5 to 3 angstroms, 1-8 angstroms, 8-16 angstroms, 44-60 angstroms, 1,050-1,350 angstroms, and 1,225-1,350 angstroms. In such photometers, the spectral selectivity of the radiation detected is defined by the absorption characteristics of the window material and gas filling within the structure. In some cases such photometers have been short lived because of their dependency on the gas filling. Over long periods of operation, the gas filling deteriorates or leaks through the window material or other structure, thereby causing failure of such prior art photometers.

SUMMARY OF THE INVENTION

This invention is directed to a photometer that comprises two basic components, a window through which radiation passes, and a cathode which has a photoelectric surface that is excited by desired radiation that passes through the window. The window is made of a conductive material or has a conductive coating thereon and is made electrically positive relative to the cathode. The window is positioned close to the cathode so that electrons produced by the cathode are attracted to the conductive window. The electrons collected on the window produces a current flow that is fed to an amplifier and measured. The measured signal is proportional to the radiation that passes through the window and excites the photoelectric surface on the cathode. The window used in this photometer blocks out penetration of all visible and near ultraviolet, whereas the infrared and lower frequency radiation which is transmitted does not affect the cathode. Therefore, the structure is suitable for detecting radiation between 150 and 800 A.

STATEMENT OF THE OBJECTS

It is therefore an object of the present invention to provide a simple, inexpensive, stable device for monitoring solar extreme ultraviolet radiation over a long period of time.

Another object is to provide a photometer which is capable of measuring and monitoring solar ultraviolet radiation in the region of 150 to 800 A.

Still another object is to provide a new window in conjunction with a cathode which is suitable for carrying out the intended results of the invention.

Yet another object is to provide a photometer which is suitable for space satellite experiments due to its rugged construction.

Further objects and advantages of the present invention will become apparent from a more careful study of the following detailed description and the accompanying drawing.

Figure 1:
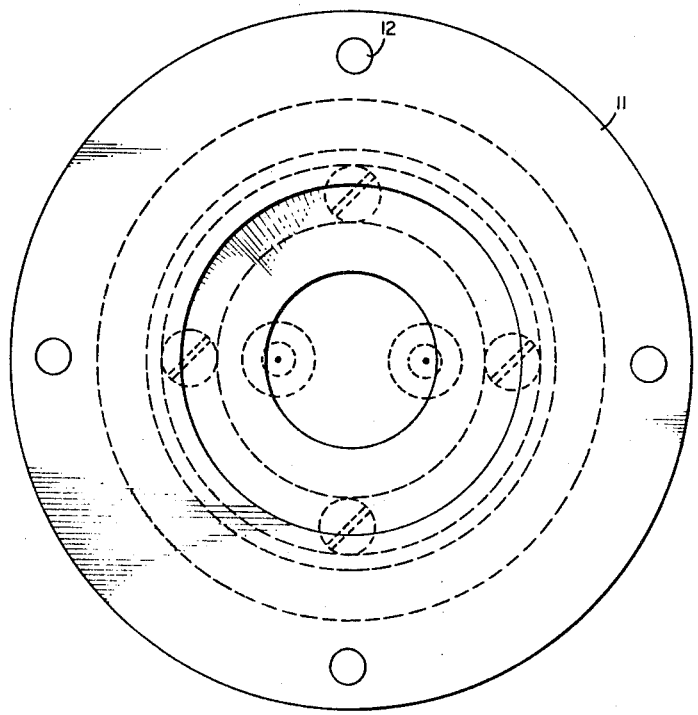
FIG. 1 illustrates a cross-sectional view of the relative parts of the photometer.
Figure 2:
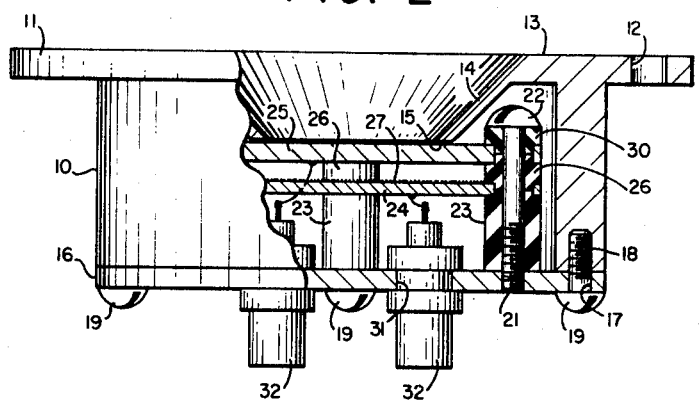
FIG. 2 is a top view to illustrate the general shape of the photometer.

Now referring to the drawing, there is shown for illustrative purposes, a photometer made in accordance with the teaching of this invention. There is shown, a two-piece housing within which a window formed of an electrically conductive material and a cathode having a photoelectric surface thereon is secured. The main body 10 of the housing is made of a nonmagnetic material, cylindrical in shape, with one end open and the opposite end having a flange 11 extending radially outward therefrom. The flange has equally spaced apertures 12 therein for securing the photometer in place when in use. Opposite the flange extending in an inwardly direction toward the interior of the cylinder is a housing portion 13 which is integral with conical section 14 fixed with its aperture end 15 extending downwardly into the area surrounded by the housing. The open end of the housing is closed by a flat plate cover 16 which has equally spaced apertures 17 therein in alignment with the main body such that the apertures align with apertures 18 in the main body for securing the flat plate cover to the main body by suitable nonmagnetic screws 19. The flat plate cover is also provided with four equally spaced threaded apertures 21 that receive the threaded end of suitable nonmagnetic screws or bolts 22 that secure Teflon pillars 23 in place such that the Teflon pillars are extending in a direction toward the other end of the housing. The Teflon pillars are used for securing the cathode 24 and window 25 in place. The window and cathode structure are separated by a spacer 26 surrounding bolt 22 to provide an open space therebetween such that the window does not touch the cathode structure during operation and such that the electrons will be drawn to the window structure when excited by radiation on the photoelectric surface 27. The window and cathode structure is assembled to the pillars such that the spacing between the window and cathode structure may be evacuated.

The flat plate cover 16 for the open end of the housing is also provided with suitable apertures 31 within which microdot connectors 32 are secured for securing an electrical wire to the cathode and to the electrically conductive window surface. The microdot connectors are used for supplying a voltage source of from 25 to 50 volts, potential between the window and the cathode. The microdot connector that connects with the electrically conductive window is also connected with a suitable amplifier for amplifying the current produced by the collected electrons and then the amplified voltage signal is measured by a suitable means which is representative of the radiation detected by the photometer.

The window is made of aluminum foil having a thickness of about 1,100 A.±100 A. and supported by a 70-mesh screen for preventing the aluminum foil from rupture due to differences in pressure from the area between the window and the cathode and the surrounding area. For detection of extreme ultraviolet radiation between 150 and 800 A. the window is made as set forth above. However, for detecting radiation of 150 to 500 A. the aluminum window has coated thereon an additional coating of carbon having a thickness of from 270±40 A. units which filters the desired radiation.

As set forth above, the cathode structure includes a photoelectric coating 27 thereon. In carrying out the present invention, the photoelectric coating may be selected from any salt or metal material whose photoelectric response is suppressed in the visible and near ultraviolet but elevated in the extreme ultraviolet. The preferred coating is that of lithium fluoride.

As an illustration of a suitable photometer made in accordance with this invention, the body is made with a 1.88-inch diameter with a depth of 0.75 inch and a flange diameter of 2.38 inches. The flat plate cover is made with the same diameter as the main body portion of the photometer. The diameter of the opening in the conical section of the housing is 0.625 inch which permits radiation to be incident onto a 1-inch diameter window. The aluminum foil window is secured onto a suitable screen which is well known in the art and the cathode structure is formed of aluminum with a lithium fluoride coating having a thickness of 2,500±200 angstroms.

On assembly, the microdot connectors are secured to the open end cover plate. The spacer 30 on the upper end for holding the window in place is placed over the screws then the window is positioned in place. The spacer separating the cathode from the window is placed over the screw against the window then the cathode is placed over the screws followed by the Teflon pillars. With the window and cathode in place the screws are secured to the open end cover plate such that the window and cathode are held in spaced relationship. The electrical conductors are then connected from one microdot connection to the window structure and between the other microdot connector and the cathode. The cover plate is then ready for securing to the housing. The Teflon pillar and spacers for securing the window and cathode in place are of such length that when the cover plate is secured to the housing, the window is adjacent to the end of the conical section of the housing. Since the window is electrically conducting, the window should not touch the conical section of the housing or it should be insulated therefrom. The structural design in assembly of the window and cathode is to provide for residual gas evacuation of the area therebetween at a rate of 0.1 atmosphere/second without adversely damaging the window or cathode surface.

In operation of the photometer for measuring and monitoring solar ultraviolet radiation in a region from 150 to 800 angstroms, all solar radiation impinges the photometer window. However, due to the absorption properties of the window material, only certain portions of the solar radiation spectrum penetrate the window. The window blocks penetration of all visible and near ultraviolet radiation permitting the remainder of the radiation to pass through the window where it is incident on the cathode. The infrared and lower frequency radiation which is transmitted does not affect the cathode. Furthermore, the high-energy X-rays which penetrate to the cathode are not of sufficient intensity to cause any noticeable contribution to the extreme ultraviolet radiation signal. Therefore, the radiation between 150 to 800 angstroms incident on the cathode causes photoelectron emission from the photoelectric coating of the cathode wherein the electrons are attracted to the electrically conductive window surface. The photometer is intended for use in the upper atmosphere, therefore the area within the housing and on all sides of the cathode will be surrounded by ambient atmosphere. Thus, when the tube is on the ground, the structure will be open to atmospheric pressures at which the tube will not function. However, when in the upper atmosphere, the area around the cathode and within the housing will be evacuated to the degree that the surrounding medium is evacuated. Therefore the tube will function as desired in the upper atmosphere. Obviously the photometer is used for detection of radiation while in the upper atmosphere. Therefore suitable well-known telemetering, receiving and recording equipment will be required to obtain a measure of the desired radiation. The electrons collected by the window surface produce an electrical current flow which is amplified and measured to indicate the amount of ultraviolet radiation incident on the cathode.

In measuring radiation of from 150 to 500-angstrom units, a window such as used for detecting radiation between 150 and 800-angstrom units is coated with a carbon film of approximately 270 angstroms in thickness deposited onto the cathode side of the aluminum window. Therefore, when using a window having a carbon coating of about 270 angstroms thereon, the window absorbs the radiation above 500 angstroms, therefore, permitting detection of radiation between 150 and 500 angstroms. Therefore, by using two photometers such as described above, one having a plain aluminum window and the other having a carbon-coated window one can determine or obtain a radiation measurement between the 500-angstrom and 800-angstrom range.

In carrying out the invention, the window and cathode are electrically insulated from each other as well as from the photometer housing and the distance between the window and cathode must be small enough to ensure 100 percent electron collection efficiency.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A photometer, which comprises:
   a housing open to ambient pressure,
   an electrically conductive window capable of transmitting radiation in a spectral region of from about 150 to about 800 angstrom units,
   a cathode,
   said cathode having a photoelectric surface facing said window which is sensitive in the spectral region from about 150 to 800 angstroms,
   said cathode and said window insulated electrically from each other and said housing and having a separation spacing sufficiently small to insure electron collection by said electrically conductive window from said cathode.

2. A photometer as claimed in claim 1; in which:
   said window is aluminum having a thickness of about 1,100 angstroms.

3. A photometer as claimed in claim 2; in which:
   said photoelectric surface on said cathode is lithium fluoride.

4. A photometer as claimed in claim 2; wherein:
   said window transmits radiation in a spectral region of from about 150 to 500 angstroms.

5. A photometer as claimed in claim 4; wherein:
   said window has a surface coated with a thin coating of carbon.

6. A photometer as claimed in claim 5; wherein:
   said coating of carbon is about 270 angstroms thick.

7. A photometer as claimed in claim 6; wherein:
   said photoelectric surface on said cathode is lithium fluoride.

8. A photometer as claimed in claim 3; wherein:
   a potential difference of from 25 to 50 volts is applied between said conductive window and said cathode.

9. A photometer as claimed in claim 7; wherein:
   a potential difference of from 25 to 50 volts is applied between said conductive window and said cathode.

* * * * *